United States Patent
Hamlin et al.

(10) Patent No.: US 10,937,243 B2
(45) Date of Patent: Mar. 2, 2021

(54) REAL-WORLD OBJECT INTERFACE FOR VIRTUAL, AUGMENTED, AND MIXED REALITY (XR) APPLICATIONS

(71) Applicant: Dell Products, L.P., Round Rock, TX (US)

(72) Inventors: Daniel L. Hamlin, Round Rock, TX (US); Yagiz Can Yildiz, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 41 days.

(21) Appl. No.: 16/116,688

(22) Filed: Aug. 29, 2018

(65) Prior Publication Data

US 2020/0074734 A1 Mar. 5, 2020

(51) Int. Cl.
| | | |
|---|---|---|
| G06T 19/00 | (2011.01) | |
| G06T 19/20 | (2011.01) | |
| G02B 27/01 | (2006.01) | |
| G06K 9/32 | (2006.01) | |
| G06T 7/20 | (2017.01) | |

(52) U.S. Cl.
CPC ........ G06T 19/006 (2013.01); G02B 27/0172 (2013.01); G06K 9/3241 (2013.01); G06T 7/20 (2013.01); G06T 19/20 (2013.01); G02B 2027/0138 (2013.01); G06T 2207/30241 (2013.01); G06T 2219/2016 (2013.01)

(58) Field of Classification Search
None
See application file for complete search history.

(56) References Cited

U.S. PATENT DOCUMENTS

| | | | | |
|---|---|---|---|---|
| 5,111,516 | A * | 5/1992 | Nakano | G06K 9/6211 382/156 |
| 9,393,693 | B1 * | 7/2016 | Kalakrishnan | B25J 9/1671 |
| 10,175,750 | B1 * | 1/2019 | Worley, III | G06F 9/451 |
| 2012/0154438 | A1 * | 6/2012 | Cohen | G06K 9/228 345/632 |
| 2013/0050258 | A1 * | 2/2013 | Liu | G02B 27/017 345/633 |
| 2015/0016777 | A1 * | 1/2015 | Abovitz | G02B 27/225 385/37 |
| 2016/0247324 | A1 * | 8/2016 | Mullins | G06F 3/012 |
| 2016/0307374 | A1 * | 10/2016 | Kurz | G06T 19/006 |
| 2017/0168556 | A1 * | 6/2017 | Goslin | A63F 13/52 |
| 2017/0300181 | A1 * | 10/2017 | Kauffmann | G06F 3/0481 |

(Continued)

*Primary Examiner* — Steven Z Elbinger
(74) *Attorney, Agent, or Firm* — Fogarty LLP

(57) ABSTRACT

Systems and methods for providing a real-world object interface in virtual, augmented, and mixed reality (xR) applications. In some embodiments, an Information Handling System (IHS) may include one or more processors and a memory coupled to the one or more processors, the memory including program instructions stored thereon that, upon execution by the one or more processors, cause the IHS to: receive a video frame during execution of an xR application; instruct a user wearing a Head-Mounted Display (HMD) to perform a manipulation of a real-world object detected in the video frame; receive additional video frames; determine whether the user has performed the manipulation by tracking the object in the additional video frames; and execute an operation in response to the determination.

17 Claims, 8 Drawing Sheets

(56) References Cited

U.S. PATENT DOCUMENTS

| | | | |
|---|---|---|---|
| 2018/0218538 A1* | 8/2018 | Short | G06T 19/006 |
| 2018/0307303 A1* | 10/2018 | Powderly | G06F 1/163 |
| 2018/0373858 A1* | 12/2018 | Farkash | G06K 9/46 |
| 2019/0005724 A1* | 1/2019 | Pahud | G06T 7/70 |
| 2019/0369752 A1* | 12/2019 | Ikeda | G06F 3/03546 |

* cited by examiner

REAL-WORLD OBJECT INTERFACE FOR VIRTUAL, AUGMENTED, AND MIXED REALITY (xR) APPLICATIONS

FIELD

The present disclosure generally relates to Information Handling Systems (IHSs), and, more particularly, to systems and methods for providing a real-world object interface in virtual, augmented, and mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for providing a real-world object interface in virtual, augmented, and mixed reality (xR) applications are described. In an illustrative, non-limiting embodiment, an Information Handling System (IHS) may include one or more processors and a memory coupled to the one or more processors, the memory including program instructions stored thereon that, upon execution by the one or more processors, cause the IHS to: receive a video frame during execution of an xR application; instruct a user wearing a Head-Mounted Display (HMD) to perform a manipulation of a real-world object detected in the video frame; receive additional video frames; determine whether the user has performed the manipulation by tracking the object in the additional video frames; and execute an operation in response to the determination.

In some implementations, the video frames may be captured by an inside-out camera mounted on the HMD. The manipulation may include, for example, rotation of the real-world object by a selected angle or in a selected direction. The angle or direction may be set by the user during a training procedure. Additionally, or alternatively, the manipulation may include, for example, translation of the real-world object along a selected trajectory. The trajectory may be set by the user during the training procedure. Additionally, or alternatively, the manipulation may include, for example, translation of the real-world object with a selected speed. The speed may be set by the user during the training procedure.

In some cases, the real-world object may be a non-electronic object. The non-electronic object may be selected by the user during a training procedure.

To instruct the user to perform the manipulation, the program instructions, upon execution, may cause the IHS to render an image for display by the HMD, where the image identifies the real-world object. In some cases, the image may indicate a rotation angle for the real-world object. Additionally, or alternatively, the image may indicate a trajectory for the real-world object. Moreover, to execute the operation, the program instructions, upon execution, may cause the IHS to grant the user access to secured content in response to a determination that the user has performed the manipulation.

In another illustrative, non-limiting embodiment, a hardware memory device may have program instructions stored thereon that, upon execution by a processor of an HMD, cause the HMD to: instruct a user wearing the HMD to perform a physical manipulation of an object identified in a video frame captured by a camera mounted on the HMD; determine whether the user has performed the physical manipulation; and execute a security operation in response to the determination.

The physical manipulation may include a rotation or translation of the object by an amount set by the user during a training procedure. The program instructions, upon execution, may cause the HMD to display an image to the user highlighting the object. The image may indicate a difference between: (i) a current rotation angle and a target rotation angle, or (ii) a current trajectory and a target trajectory during the physical manipulation. Moreover, executing the security operation may include granting the user access to secured content, stored in an IHS coupled to the HMD.

In yet another illustrative, non-limiting embodiment, a method may include: designating an object for image recognition; recognizing the object based upon an image captured during execution of an augmented reality (AR) application; instructing a user wearing an HMD to manipulate the object; determining that the user has manipulated the object with at least one of: a selected angle, a selected direction, a selected trajectory, or a selected speed; and granting the user access to content in response to the determination.

BRIEF DESCRIPTION OF THE DRAWINGS

The present invention(s) is/are illustrated by way of example and is/are not limited by the accompanying figures.

Elements in the figures are illustrated for simplicity and clarity, and have not necessarily been drawn to scale.

DETAILED DESCRIPTION

Embodiments described herein provide systems and methods for providing a real-world object interface in virtual, augmented, and mixed reality (xR) applications. These techniques are particularly useful in xR applications that employ HMDs, Heads-Up Displays (HUDs), and eyeglasses—collectively referred to as "HMDs."

Figure 1:
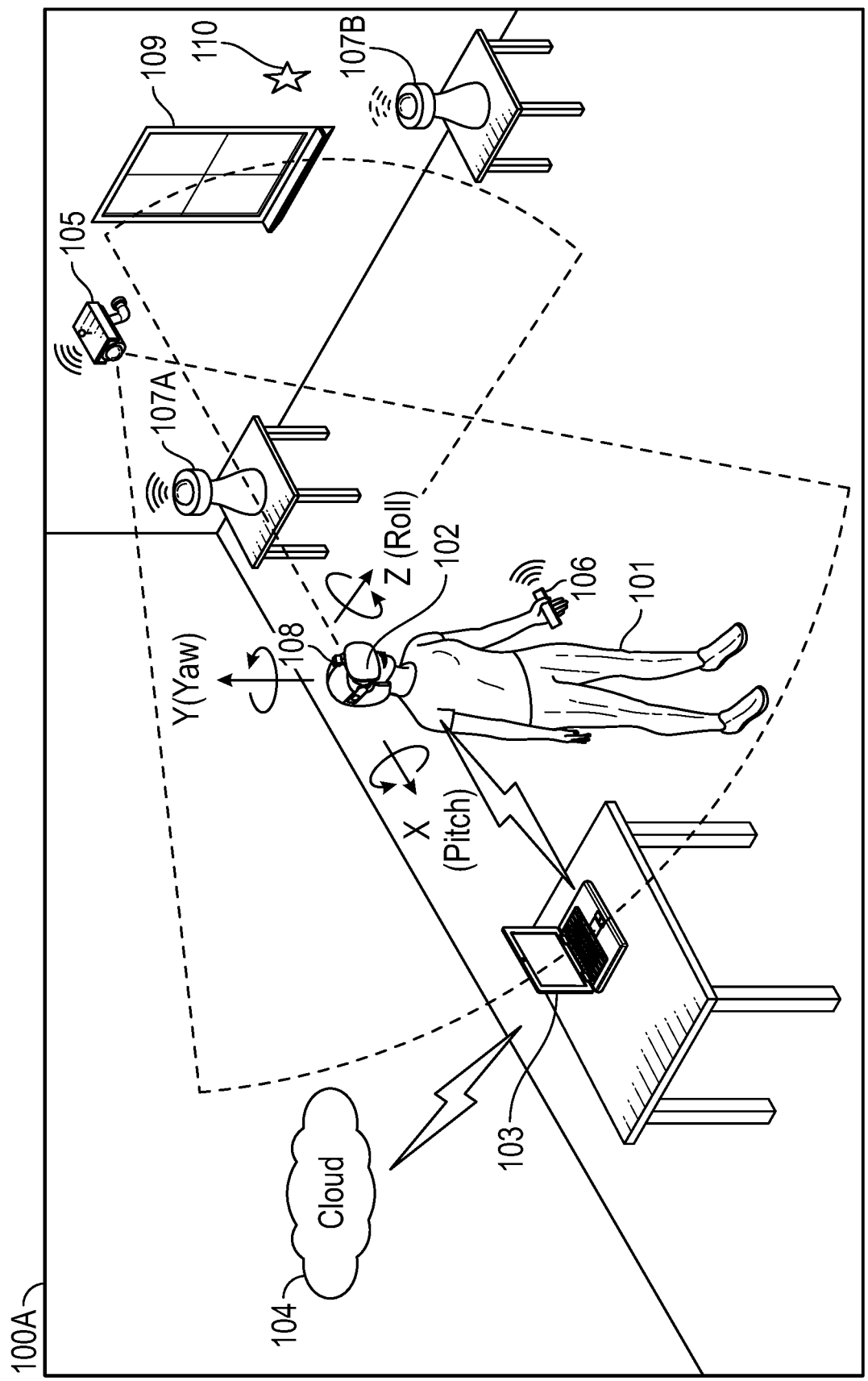
FIG. 1 illustrates an example of an environment where a virtual, augmented, or mixed reality (xR) application may be executed, according to some embodiments.

FIG. 1 is a perspective view of environment 100 where an xR application is executed. As illustrated, user 101 wears HMD 102 around his or her head and over his or her eyes. In this non-limiting example, HMD 102 is tethered to host Information Handling System (IHS) 103 via a wired or wireless connection. In some cases, host IHS 103 may be built into (or otherwise coupled to) a backpack or vest, wearable by user 101.

In environment 100, the xR application may include a subset of components or objects operated by HMD 102 and another subset of components or objects operated by host IHS 103. Particularly, host IHS 103 may be used to generate digital images to be displayed by HMD 102. HMD 102 transmits information to host IHS 103 regarding the state of user 101, such as physical position, pose or head orientation, gaze focus, etc., which in turn enables host IHS 103 to determine which image or frame to display to the user next, and from which perspective.

As user 101 moves about environment 100, changes in: (i) physical location (e.g., Euclidian or Cartesian coordinates x, y, and z) or translation; and/or (ii) orientation (e.g., pitch, yaw, and roll) or rotation, cause host IHS 103 to effect a corresponding change in the picture or symbols displayed to user 101 via HMD 102, in the form of one or more rendered video frames.

Movement of the user's head and gaze may be detected by HMD 102 and processed by host IHS 103, for example, to render video frames that maintain visual congruence with the outside world and/or to allow user 101 to look around a consistent virtual reality environment. In some cases, xR application components executed by HMD 102 and IHS 103 may provide a cooperative, at least partially shared, xR environment among a plurality of users. For example, each user may wear their own HMD tethered to a different host IHS, such as in the form of a video game or a productivity application (e.g., a virtual meeting).

Figure 2:
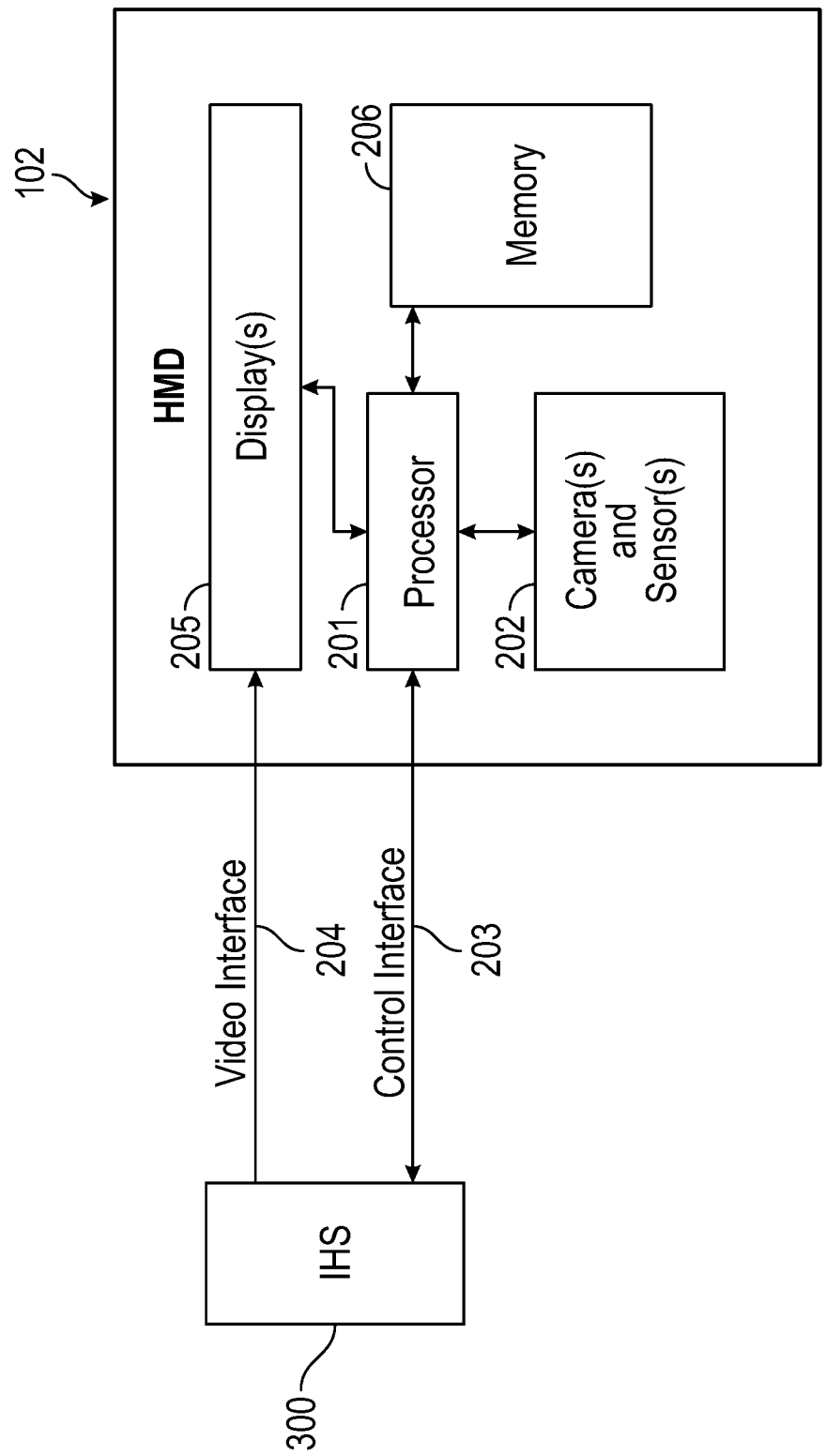
FIG. 2 illustrates an example of electronic components of a Head-Mounted Display (HMD), according to some embodiments.

FIG. 2 illustrates an example of electronic components of HMD 102. In various embodiments, HMD 102 may include number of camera(s) and/or sensor(s) 202 coupled to processor or controller 201, according to some embodiments. Examples of camera(s) 202 include, but are not limited to: inside-out cameras, eye tracking cameras, RGB cameras, IR cameras, etc. Meanwhile, examples of sensor(s) 202 include, but are not limited to: RGB cameras, infrared (IR) cameras, electric, magnetic, radio, optical, infrared, thermal, force, pressure, acoustic, ultrasonic, proximity, position, deformation, movement, velocity, rotation, gyroscopic, and/or acceleration sensor(s). In some cases, camera(s) and/or sensor(s) 202 may be coupled to processor or controller 201 via a sensor hub, or the like.

Processor or controller 201 of HMD 102 is also coupled to IHS 300 (FIG. 3) via a wired (e.g., USB) or wireless connection (e.g., Wi-Fi, Bluetooth, etc.), thus establishing control interface 203. Control interface 203 may provide a communication channel between processor 201 and IHS 300 to facilitate execution of an xR application. For example, program instructions stored in memory 206, when executed by processor 201, may cause video frames captured by camera(s) 202 to be transmitted to IHS 300 via control interface 203.

IHS 300 may in turn execute SLAM module 403 (FIG. 4), for example, based upon landmarks found in the video frames received from HMD 102 (or from outside-in camera 108). Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to display(s) 205 via video interface 204 (e.g., HDMI, DVI, DISPLAYPORT, etc.).

Video interface 204 may drive both a right and left display 205 (one for each eye), in order to provide a 3-D or stereoscopic view. In some cases, video interface 204 may include two separate video interfaces, one for each display 205. Additionally, or alternatively, a single interface that supports multi-stream may be used to drive both displays 205.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
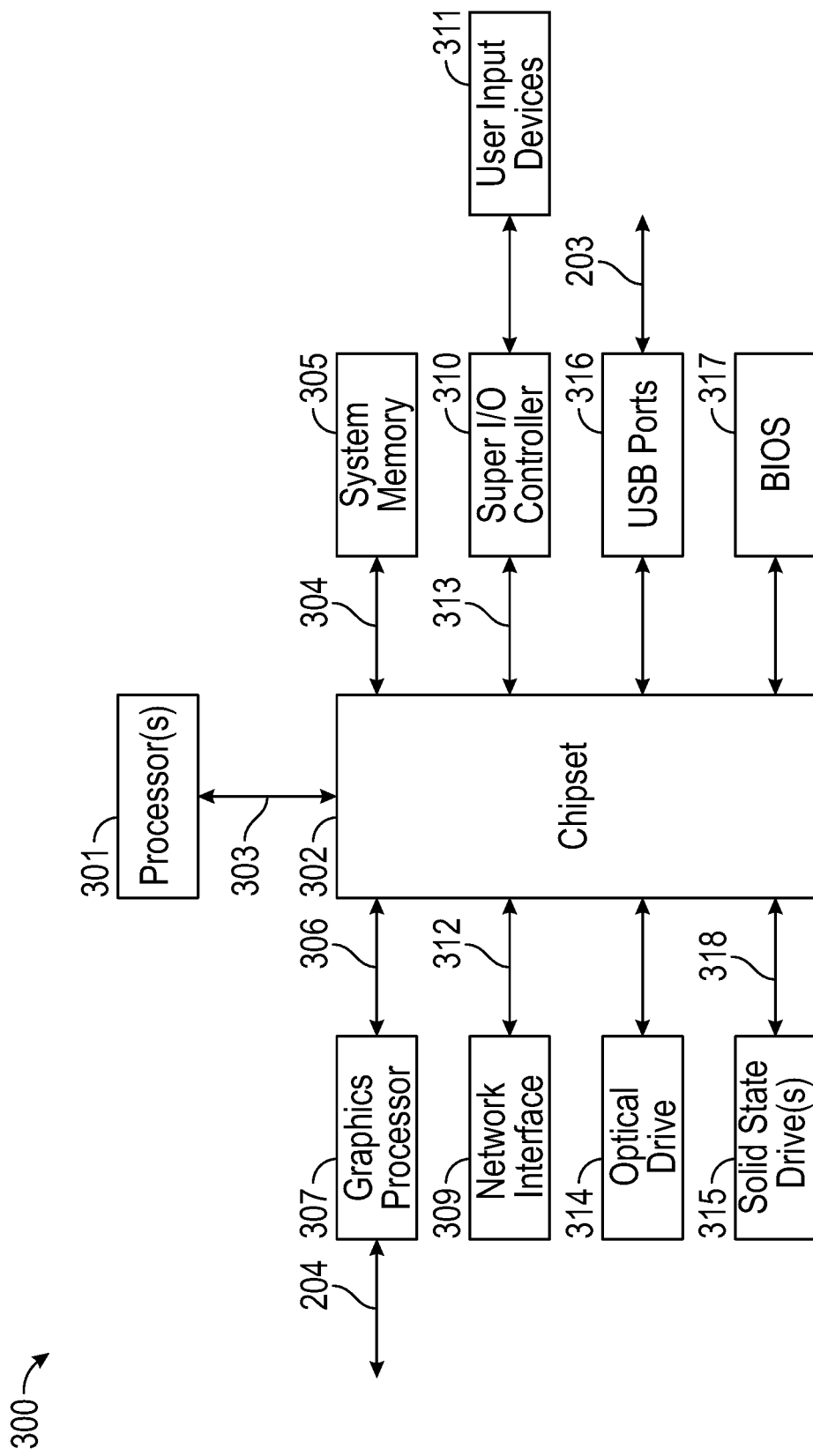
FIG. 3 illustrates an example of electronic components of an Information Handling System (IHS), according to some embodiments.

FIG. 3 is a block diagram of IHS 300 configured to implement host IHS 103, according to certain embodiments. As shown, IHS 300 may include one or more processors

301. In various implementations, IHS 300 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 300 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of the IHS 300. Graphics processor 307 may be coupled to the chipset 302 via a graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 204 (e.g., HDMI, DVI, DISPLAYPORT, etc.).

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of the IHS 300 through the chipset 302. In certain embodiments, chipset 302 may be coupled to a network interface 309, such as provided by a Network Interface Controller (NIC) that is coupled to the IHS 300. In certain embodiments, the network interface 309 may be coupled to the chipset 302 via a PCIe bus 312. According to various embodiments, network interface 309 may support communication via various wired and/or wireless networks. In certain embodiments, the chipset 302 may also provide access to one or more Universal Serial Bus (USB) ports 316; which in some implementations may serve as transport for establishing control interface 203 with HMD 102.

Chipset 302 also provides access to one or more solid-state storage devices 315. The chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 300 may also utilize one or more magnetic disk storage devices, or other types of the storage devices such as an optical drive or a removable-media drive. In various embodiments, the solid-state storage device 315 may be integral to the IHS 300, or may be located remotely from the IHS 300.

Another resource that may be accessed by processor(s) 301 via chipset 302 is a Basic Input/Output System (BIOS) 317. As described in more detail below with respect to additional embodiments, upon powering or restarting IHS 300, processor(s) 301 may utilize BIOS 317 instructions to initialize and test hardware components coupled to the IHS 300 and to load an operating system for use by the IHS 300. BIOS 317 provides an abstraction layer that allows the operating system to interface with certain hardware components that are utilized by IHS 300. Via this hardware abstraction layer provided by BIOS 317, the software executed by the processor(s) 301 of IHS 300 is able to interface with certain I/O devices that are coupled to the IHS 300. The Unified Extensible Firmware Interface (UEFI) was designed as a successor to BIOS. As used herein, the term "BIOS" is intended to also encompass UEFI.

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
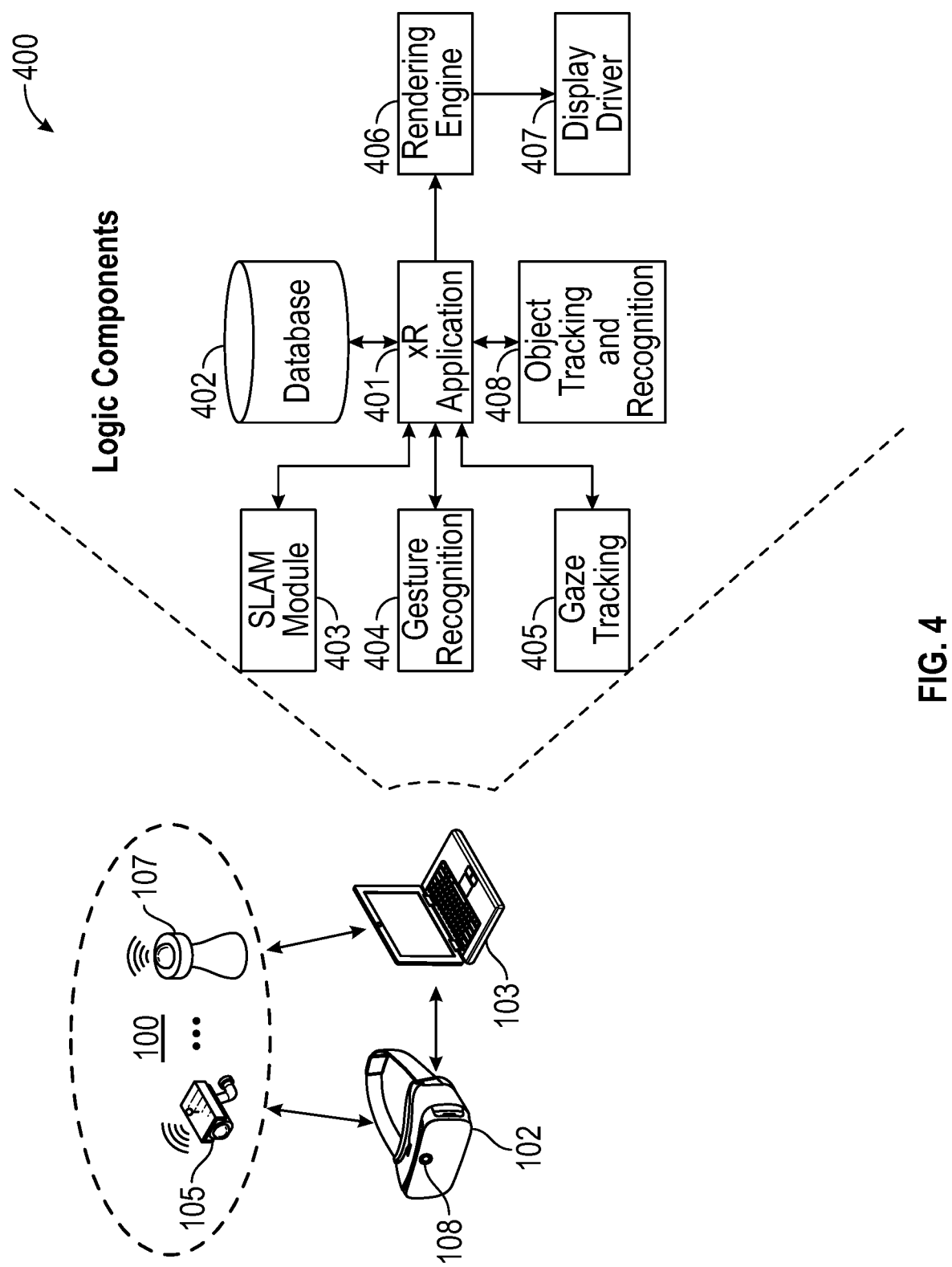
FIG. 4 illustrates an example of logic components of an xR application, according to some embodiments.

FIG. 4 illustrates logic components 400 of xR application 401. Generally, xR application 401 may include any xR application now existing or yet to be developed, including, but not limited to: entertainment, video games, robotics, therapy, education and training, military uses, occupational safety, engineering, industrial product design, collaboration applications, virtual meetings, etc.

SLAM module 403 uses positional tracking devices among camera(s) and sensor(s) 202 to construct a map of an unknown environment where an HMD is located, and that simultaneously identifies where the HMD is located, its orientation, and/or pose.

Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

To enable positional tracking for SLAM purposes, HMD 102 may use wireless, inertial, acoustic, or optical sensors among sensor(s) 202. And, in many embodiments, each different SLAM method may use a different positional tracking source or device. For example, wireless tracking may use a set of anchors or lighthouses 107A-B that are placed around the perimeter of environment 100 and/or one or more totems 106 or tags 110 that are tracked; such that HMD 102 triangulates its position and/or state using those elements. Inertial tracking may use data from an accelerometer and/or gyroscope within HMD 102 to find a velocity (e.g., m/s) and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera. With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

An estimator, such as an Extended Kalman filter (EKF) or the like, may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100 may be obtained, at least in part, from cloud 104.

Gesture recognition module 404 may also use one or more cameras or optical sensors 202 that enable user 101 to use their actual hands for interaction with virtual objects (VOs) rendered by display 205 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Generally, gesture detection begins when video frame data (e.g., a video or depth-video stream) is received at host IHS 103 from camera 108 of HMD 102. In some implementations, video data may have already been processed, to some degree, by processor 201 of HMD 102. Then, the video data is further processed to control aspects of xR application 401, by identifying various gestures and sequences that constitute user input.

At least a portion of the user's body may be identified in the video frame data obtained using camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a generalized geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond.

For example, machine-learning may be used to assign each pixel a body-part index and/or body-part probability distribution. Such a machine-learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger).

In some embodiments, each joint may be assigned a number of parameters, such as, for example, Cartesian coordinates specifying joint position, angles specifying joint rotation, and other parameters specifying a conformation of the corresponding body part (e.g., hand open, hand closed, etc.). Skeletal-fitting algorithms may use the depth data in combination with other information, such as color-image data and/or kinetic data indicating how one locus of pixels moves with respect to another. Moreover, a virtual skeleton may be fit to each of a sequence of frames of depth video. By analyzing positional change in the various skeletal joints and/or segments, certain corresponding movements that indicate predetermined gestures, actions, or behavior patterns of user 101 may be identified.

In other embodiments, the use of a virtual skeleton may not be necessary. For example, in other implementations, raw point-cloud data may be sent directly to a feature extraction routine within a gesture recognition module.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

In various implementations, gaze tracking module 405 may use, among camera(s) and/or sensor(s) 202, NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection based calculations that use NIR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

Rendering engine 406 may include any engine (e.g., UNITY, UNREAL, AUTODESK, etc.) configured to render an xR model displayed by HMD 102 from user 101's unique point-of-view based upon the user's coordinate location (e.g., from SLAM module 403), the user's pose (e.g., IMU), and/or the user's gaze (e.g., from gaze tracking module 405). Display driver 407 is coupled to rendering engine 406 and configured to convert rendered video frames to a display format that HMD 102 can reproduce before the user's' eyes.

Object tracking and recognition module 408 may implement any object identification or detection technique based on visual images, including, but not limited to: edge detection, corner detection, blob detection, ridge detection, or the like. In some cases, object tracking and recognition module 408 may operate with SLAM module 403 to track the position or movement of objects using landmarks or the like.

Database 402 may include if/then rules with real-world objects and their location, orientation, and/or movement (e.g., angle(s), direction(s), trajector(ies), speed(s), etc.). In some cases, an if/then rule catalog may be filtered based upon the presence or identification of a master object and/or other surrounding, secondary objects in the user's FOV. Database 402 may include different if/then rule catalogs based upon the identity of an authenticated user, for example, as part of a profile. Additionally, or alternatively, if/then rules may be based upon historic continuous usage. Additionally, or alternatively, if/then rules in database 402 may be selected by xR application 401 to provide improved security, for example, by asking a user to perform physical actions on the objects in the FOV in a randomized manner.

In some cases, if/then rules in database 402 may be based upon the user's whole environment, such that same object and action can mean something different at home and work, or may not be performed if the user is in a forbidden environment. For example, if/then rules may take into consideration people in the user's FOV or around the user (e.g., boss or kids in the surrounding), and/or landmarks (objects around the master object) in the FOV and their location.

Figure 5A:
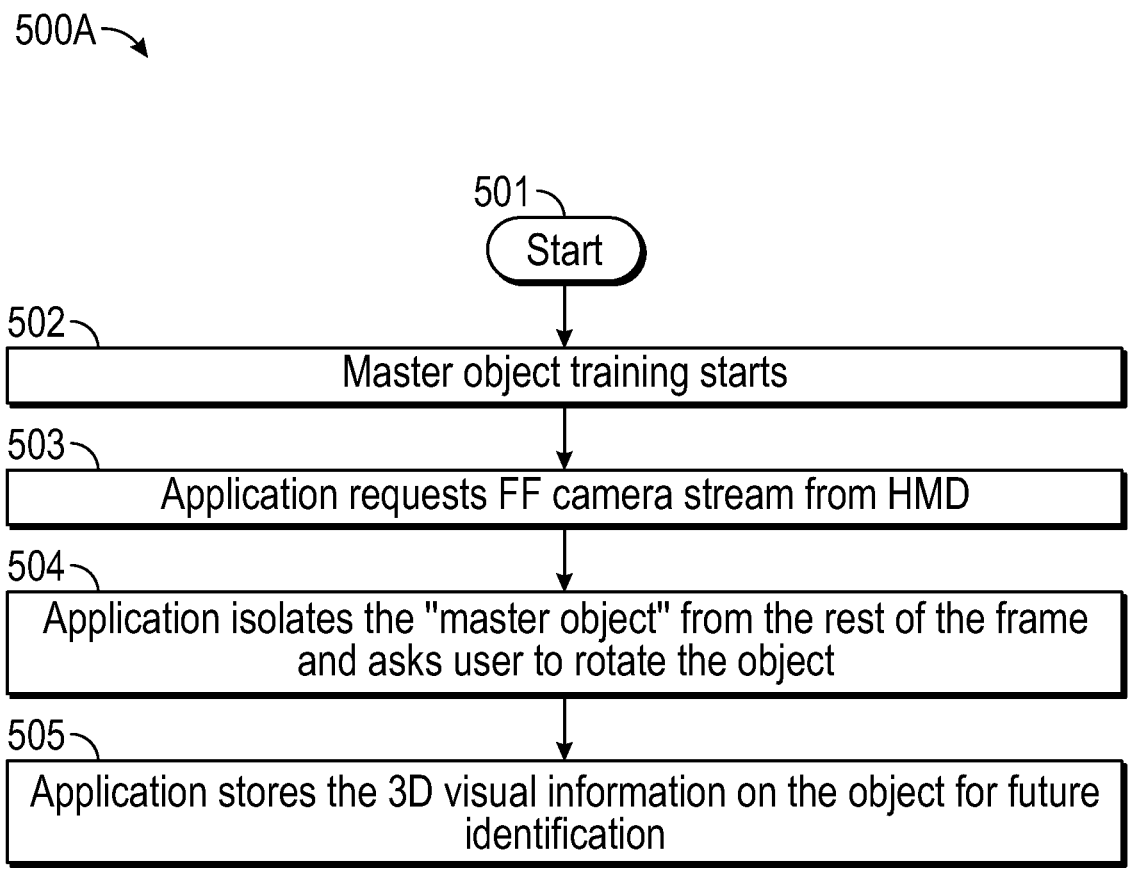
FIGS. 5A-C illustrate examples of methods for providing a real-world object interface in an xR application, according to some embodiments.
Figure 5B:
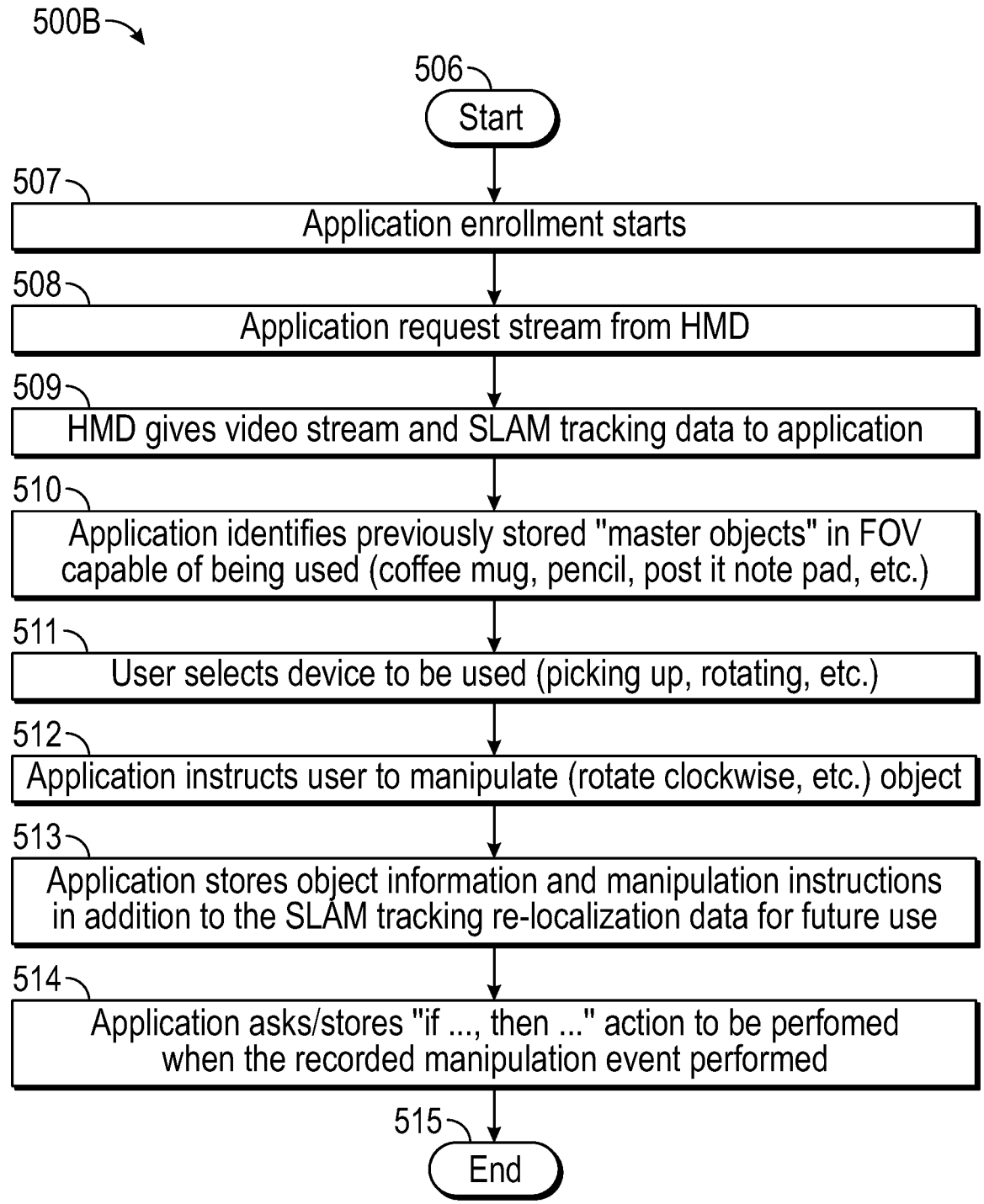
Figure 5C:
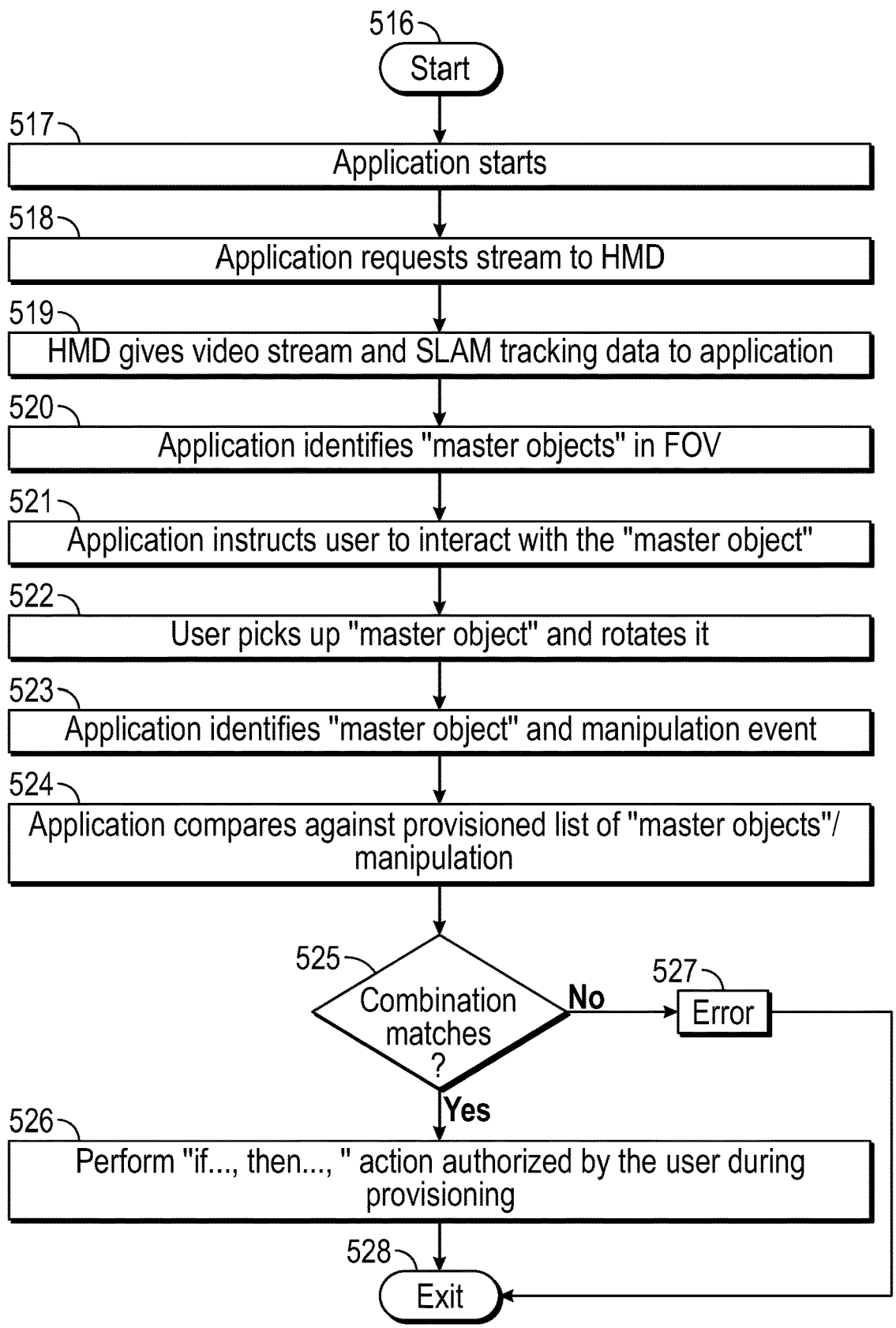

In various implementations, database 402 may include program instructions and/or information related to object training (FIG. 5A). Additionally, or alternatively, database 402 may include program instructions and/or information related to provisioning (FIG. 5B). Additionally, or alternatively, database 402 may include program instructions and/or information related to verification (FIG. 5C).

In various embodiments, systems and methods described herein may introduce everyday objects as input devices, and may also give users the flexibility to assign any meaning to those objects. For example, rotating a coffee mug clockwise by 45 degrees may cause an IHS to turn up the volume, open a calendar application, log into a private folder, or take any other programmable responsive action.

Accordingly, xR application 401 may include: (i) training of the object detection for master objects; (ii) front-facing camera and inside-out SLAM tracking integration for environment mapping/re-localization (remembering) and recording of action(s)/manipulation(s) performed; and (iii) a service to set "if/then" rules corresponding to the master objects/manipulations recorded.

For example, if user 101 logs into their work computer while wearing an AR headset, they can turn their favorite coffee mug (or any other object, such as flowers, picture frames, etc.) into a "key" to enable access to private folders. First, the user may train object recognition module 408 by presenting the coffee mug from different angles and/or in different light conditions. The front-facing camera and inside-out SLAM tracking may be used to record the worker's environment. Then, the user may set a rule to make the relevant private folders appear, for instance, in response to the coffee mug being identified on the desk and being rotated by 45 degrees, being moved across the desk along a predetermined trajectory, etc.

In other examples, users may set rules based on the people around them. For instance, in some xR applications 401, object recognition module 408 may detect the user's child's face, and a rule to skip music with explicit language may be set for a music appliance.

In yet other examples, real-world objects may be used to ensure that the user wearing HMD 102 is the only one operating a given system, and/or that there is no remote intruder. For example, in some xR applications 401, HMD 102 may pick a randomized object in the user's FOV and instruct the user to physically interact with it in a known manner (e.g., rotate, flip, etc.) to provide an additional layer of security.

FIGS. 5A-C illustrate examples of methods 500A-C that, operating in combination, provide a real-world object interface in xR application 401. Particularly, method 500A is an object provisioning method, method 500B is an object/manipulation enrollment method, and method 500C is a verification method.

Referring to FIG. 5A, provisioning method 500A begins at block 501. At block 502, method 500 begins training of a "master object" (e.g., a template or instance of a template). At block 503, xR application 401 requests an inside-out or forward-facing (ff) camera stream from HMD 102. At block 504, xR application 401 isolates the master object from the rest of the frame and asks the user to rotate the object. Then, at block 505, xR application 401 stores 3-D visual information on the object for future identification, for example, in database 402. Master objects may be recorded as metadata, 3D objects, SLAM landmarks, or any combination thereof. In some implementations, recorded manipulations on a master object may also include gestures and/or voice commands.

In FIG. 5B, object manipulation/enrollment method 500B begins at block 506. At block 507, xR application 401 begins an enrollment process, for example, in response to a request from user 101 to secure stored content (e.g., in database 402). At block 508, xR application 401 requests an inside-out or forward-facing (ff) camera stream from HMD 102. At block 509, HMD 102 provides video stream and SLAM tracking data to xR application 401.

At block 510, xR application 401 identifies master objects previously stored in database 402 (e.g., as a result of method 500A), in the user's field-of-view (FOV) capable of being used (e.g., a non-electronic object such as a coffee mug, a pencil, a POST-IT notepad, etc.). At block 511, user 101 selects a device or object to be used (e.g., by picking it up, rotating it, etc.). At block 512, xR application 401 instructs user 101 to physically manipulate the object.

At block 513, xR application 401 stores object information and manipulation instructions (e.g., rotation angle, rotation direction, position, trajectory, distance, speed, velocity, acceleration, etc.); in addition to SLAM tracking and re-localization information data for future use. At block 514, xR application 401 asks/stores "if/then" action(s) to be performed when the recorded manipulation event is detected. Object manipulation/enrollment method 500B ends at block 515.

Verification method 500C of FIG. 5C begins at block 516. At block 517, xR application 401 beings a verification process, for example, in response to a request from user 101 to access secured content (e.g., stored in database 402). At block 518, xR application 401 requests an inside-out or forward-facing (ff) camera stream from HMD 102. At block 519, HMD 102 provides a video stream and SLAM tracking data to xR application 401.

At block 520, xR application 401 identifies master objects in the user's FOV. At block 521, xR application 401 instructs user 101 to interact with a selected master object. At block 522, user 101 picks up the object and rotates it. At block 523, xR application 401 identifies and/or detects the master object and the manipulation event.

At block 524, xR application 401 compares the object/manipulation event against a provisioned list of master objects or manipulations. Block 525 determines whether the combination matches.

For example, block 525 may determine whether there has been a rotation of the real-world object by a selected angle (e.g., greater than X radians, smaller than Y radians, or between X and Y radians) or in a selected direction (e.g., clockwise or counterclockwise), as set by the user in object manipulation/enrollment method 500B. Additionally, or alternatively, block 525 may determine whether there has been a translation of the real-world object along a selected trajectory (e.g., a set of coordinate points outlining a motion or curve in 2D or 3D space) and/or with a selected speed (e.g., greater than X m/s, smaller than Y m/s, or between X and Y m/s), as also set by the user in object manipulation/enrollment method 500B.

In some cases, still at block 525, method 500C may render an image for display by HMD 102 during the verification process, where the image identifies the real-world object (e.g., a highlighting overlay, an icon, etc.). In some cases, the image may indicate a rotation angle and/or a trajectory to be followed by the real-world object. The image may also dynamically indicate a difference between: (i) a current rotation angle and a target rotation angle, or (ii) a current trajectory and a target trajectory, during the verification process' physical manipulation.

If there is no match, block 527 generates an error and method 500C ends at block 528. Otherwise, block 526 performs one or more if/then rules stored in database 402, as authorized by user 101 during provisioning (block 514).

Figure 6:
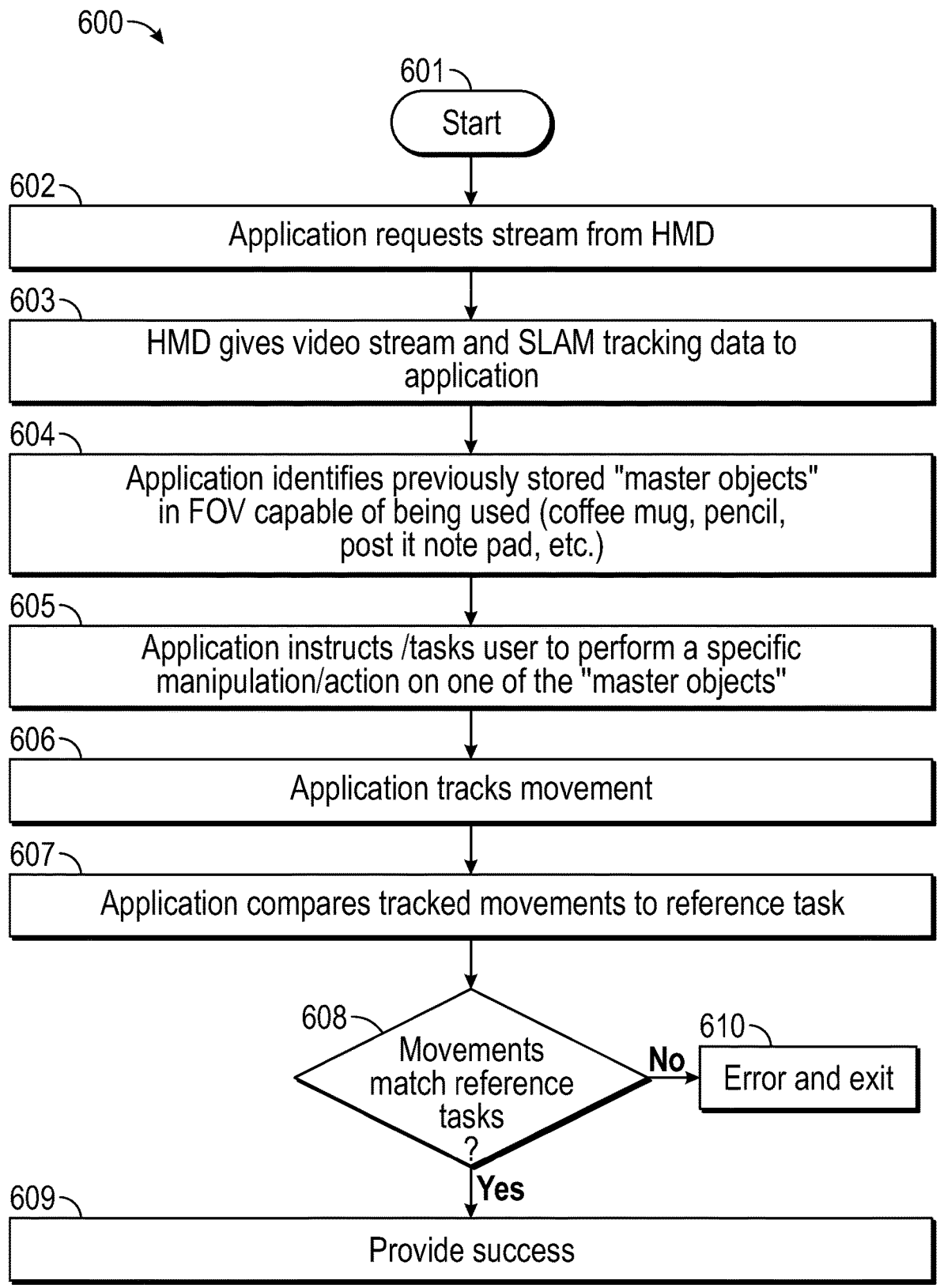
FIG. 6 illustrates an example of a method for providing augmented security in an xR application as an example use-case, according to some embodiments.

FIG. 6 illustrates method 600 for providing augmented security in an xR application as an example use-case. As shown, method 600 begins at block 601. At block 602, xR application 401 requests an inside-out or forward-facing (ff) camera stream from HMD 102. At block 603, xR application 401 identifies a previously stored master object in the user's FOV that is capable of being used.

At block 605, xR application 401 instructs user 101 to perform a specific manipulation or action on the master object. At block 606, xR application 401 tracks movement of the object, for example, by operating object tracking and recognition module 408 upon one or more subsequently captured video frames. At block 607, xR application 401 compares tracked movement to a reference task.

At block 608, if the movements match the reference task, block 609 results in success (e.g., a command is executed, secured content is unblocked, etc.). Otherwise, block 610 results in an error being produced (and optionally xR application 401 exiting).

In some embodiments, xR application 401 may determine whether a user's interaction or manipulation of a real-world object is natural, or whether it is an attempted UI command. In some cases, allowed manipulations may require a minimum level of complexity necessary to avoid false positives (e.g., a coffee mug has to move with a minimum speed that is outside of natural drinking behavior). Additionally, or alternatively, a trigger to set intention may be defined, such that a user may choose to demonstrate intent to use the real-world object for UI input by clicking on certain keyboard keys or using voice commands, etc. In these cases, only after that trigger can the real-world object be accepted as input.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
one or more processors; and
a memory coupled to the one or more processors, the memory including program instructions stored thereon that, upon execution by the one or more processors, cause the IHS to:
receive a video frame during execution of a virtual, augmented, or mixed reality (xR) application;
instruct a user wearing a Head-Mounted Display (HMD) to perform a manipulation of a specified speed of a real-world object detected in the video frame;
receive additional video frames;
identify whether the user has performed the manipulation by tracking the object in the additional video frames;
determine that the manipulation has been performed with a level of complexity configured to avoid false positives; and
at least one of:
(a) grant access to secured content in response to the user having performed the manipulation at the specified speed; or
(b) deny access to the secured content in response to the user having performed the manipulation at a different speed.

2. The IHS of claim 1, wherein the additional video frames are captured by an inside-out camera mounted on the HMD.

3. The IHS of claim 1, wherein the manipulation comprises rotation of the real-world object by a selected angle or in a selected direction.

4. The IHS of claim 3, wherein the angle or direction are set by the user during a training procedure.

5. The IHS of claim 1, wherein the manipulation comprises translation of the real-world object along a selected trajectory.

6. The IHS of claim 5, wherein the trajectory is set by the user during a training procedure.

7. The IHS of claim 1, wherein the speed is set by the user during a training procedure.

8. The IHS of claim 1, wherein the real-world object is a coffee mug.

9. The IHS of claim 1, wherein to instruct the user to perform the manipulation, the program instructions, upon execution, cause the IHS to:
render an image for display by the HMD, wherein the image identifies the real-world object.

10. The IHS of claim 9, wherein the image indicates a rotation angle for the real-world object.

11. The IHS of claim 9, wherein the image indicates a trajectory for the real-world object.

12. A hardware memory device having program instructions stored thereon that, upon execution by a processor of a Head-Mounted Display (HMD), cause the HMD to:
instruct a user wearing the HMD to perform a physical manipulation of an object identified in a video frame captured by a camera mounted on the HMD, the manipulation performed at a specified speed;
identify whether the user has performed the physical manipulation;
determine that the physical manipulation has been performed with the specified speed that is higher than a natural handling speed of the object; and
execute a security operation in response to the determination, wherein the security operation comprises at least one of:
(a) grant access to secured content in response to detecting the manipulation at the specified speed; or
(b) deny access to the secured content in response to detecting the manipulation at a different speed.

13. The hardware memory device of claim 12, wherein the physical manipulation comprises a rotation or translation of the object by an amount set by the user during a training procedure.

14. The hardware memory device of claim 12, wherein the program instructions, upon execution, further cause the HMD to display an image to the user highlighting the object.

15. The hardware memory device of claim 12, wherein the image indicates a difference between: (i) a current rotation angle and a target rotation angle, or (ii) a current trajectory and a target trajectory during the physical manipulation.

16. The hardware memory device of claim 12, wherein secured content is stored in an Information Handling System (IHS) coupled to the HMD.

17. A method, comprising:
recognizing an object based upon an image captured via a camera mounted on a Head-Mounted Display (HMD) during execution of an augmented reality (AR) application;
determining that: (a) the user clicked a key or uttered a command, and (b) after the click or utterance, the user manipulated the object with a specified speed; and
at least one of:
- (a) granting access to secured content in response to: (i) the user having performed the manipulation at the specified speed, and (ii) detecting an absence of another person; or
- (b) denying access to the secured content in response to: (i) the user having performed the manipulation at a different speed, and (ii) detecting a presence of another person.

\* \* \* \* \*